United States Patent [19]

Sullivan et al.

[11] Patent Number: 5,076,593
[45] Date of Patent: Dec. 31, 1991

[54] DISC BRAKE CALIPER SEAL

[75] Inventors: William M. Sullivan, Rochester Hills; James L. Weber, West Bloomfield, both of Mich.; Helumut Ruckert, Reinheim; Harald Gobel, Herborn-Seelbach, both of Fed. Rep. of Germany

[73] Assignee: ITT Corporation, New York, N.Y.

[21] Appl. No.: 609,297

[22] Filed: Nov. 5, 1990

[51] Int. Cl.⁵ .................. F16J 15/32; F16D 65/38
[52] U.S. Cl. .................. 277/205; 277/215; 277/177; 277/168; 188/71.8; 188/72.4; 188/196 P; 188/370
[58] Field of Search .............. 277/205, 214, 215, 177, 277/168, 206 R, 206 A, 27, 170; 188/72.4, 72.5, 71.8, 196 P, 370

[56] References Cited

U.S. PATENT DOCUMENTS

| | | | |
|---|---|---|---|
| 3,377,076 | 4/1968 | Burnett | 188/71.8 |
| 3,854,737 | 12/1974 | Gilliam, Sr. | 277/205 |
| 3,912,051 | 10/1975 | Yokoi et al. | 188/72.5 |
| 3,915,461 | 10/1975 | Gautier | 188/196 P X |
| 4,045,037 | 8/1977 | Pippert | 277/205 |
| 4,193,481 | 3/1980 | Wunderlich | 188/71.8 |
| 4,387,901 | 6/1983 | Ritsema | 188/196 P X |
| 4,715,479 | 12/1987 | Buckley | 188/196 P X |
| 4,858,516 | 8/1989 | Klein | 188/72.4 X |
| 4,860,858 | 8/1989 | Erben et al. | |

FOREIGN PATENT DOCUMENTS

| | | | |
|---|---|---|---|
| 2326047 | 5/1973 | Fed. Rep. of Germany | 188/196 P |
| 1043331 | 9/1966 | United Kingdom | 188/196 P |
| 2030667 | 4/1980 | United Kingdom | 188/196 P |

Primary Examiner—William A. Cuchlinski, Jr.
Assistant Examiner—J. K. Folker
Attorney, Agent, or Firm—Robert P. Seitter; J. Gordon Lewis

[57] ABSTRACT

A disc brake caliper seal arrangement wherein an annular seal is provided between the caliper housing and the outside diameter of the piston provided therein. The seal provides a rollback function which returns the piston to a given running clearance between the disc rotor and brake pads after actuation of the brake. The seal is provided in a substantially square or rectangular cross-sectional configuration and is disposed in a seal groove of the caliper housing. The seal is provided with annular recesses on the ends of the parallel sides of the seal adjacent to the outside diameter of the piston. The central portion of the side of the seal which engages the outside diameter of the piston is provided with a circumferential groove. The recesses provide space of sufficient volume for the seal to deflect into before encountering the straight groove side wall, thereby eliminating the need for a machined chamfer in the housing groove. A groove in the center portion of the seal functions at high braking pressures, such as during a panic stop, to provide additional rollback and to reduce the loss of the required running clearances.

4 Claims, 2 Drawing Sheets

DISC BRAKE CALIPER SEAL

BACKGROUND OF THE INVENTION

The present invention relates to a disc brake caliper arrangement and, more particularly, a seal arrangement surrounding a piston provided within the disc brake caliper which provides both sealing and rollback function.

Disc brakes and disc brake calipers are known and have been widely used in the art. Typically, these devices include a caliper housing which surrounds the disc brake rotor and which housing includes a pair of brake pads on opposite sides of the disc rotor. A piston is slidably mounted in an inwardly directed portion of the brake housing. The piston is hydraulically actuated through a brake line connected to the caliper housing. Upon actuation, the piston is translated and the inner brake pad which then frictionally engages the brake pad with the rotor and simultaneously pulls the other end of the housing toward the outer brake pad into frictional engagement with the brake rotor disc mounted to the wheel of the vehicle. These devices have utilized a seal disposed in a groove in the housing of the caliper which seal engages the outside diameter of the piston. The seal performs an important function in that after actuation of the disc brake, and the resulting deformation of the seal toward the inner brake pad, return of the piston is accomplished by the so-called rollback of the seal wherein the seal returns the piston to its initial position thereby providing a running clearance for the brake system. This running clearance is required to avoid roughness of the brake operation if the clearance is too little and conversely spongy operation of the brake system if the clearance is too great. In these known systems, the seal is provided in a groove of the caliper housing which is further provided with a substantial chamfer along the inner edge of the caliper housing. This chamfer provides an area for the seal to deflect upon actuation of the brakes and relaxation of the seal once the braking operation is completed. Relaxation of the seal is intended to retract the piston to its normal position thereby providing the required running clearance as discussed above. It has been found that the required retraction for running clearance provided by these prior art disc brake caliper seals is unsatisfactory with respect to both brake roughness and spongy brake pedal movement.

These and other disadvantages are overcome by the present invention wherein a disc brake caliper seal arrangement is provided wherein a novel seal arrangement is provided which eliminates the need for providing a machine chamfer in the caliper housing and wherein the resulting running clearance is optimized and variation about this point minimized.

SUMMARY OF THE INVENTION

Briefly, a disc brake caliper seal arrangement for a disc brake having at least one brake pad for engaging a disc rotor is provided. The arrangement comprises a disc brake caliper housing and a piston slidably mounted in the housing for engaging the brake pad against the rotor upon actuation of the disc brake. A generally annular housing groove is provided in the housing and faces the outside diameter of the piston. A generally annular seal is provided in the housing groove and the seal is provided in a generally rectangular cross-sectional configuration. The seal includes at least one annular recess providing relief portion adjacent the outside diameter of the piston extending along a portion of the side of the piston seal, and which extends away from the housing diameter of the piston. The groove is substantially straight sided on the side adjacent the access so that seal deflection is controlled entirely by the recess volume.

It has been found that the present invention provides a significant improvement reducing the variability of running clearance as demonstrated in Table 1 below.

TABLE 1

| | Running Clearance (nominal ± 30) | |
|---|---|---|
| | 20 bars | 100 bars |
| Prior Art: | 0.35 ± 0.26 mm | 0.17 ± .14 mm |
| Present Invention: | 0.18 ± 0.06 mm | 0.15 ± .05 mm |

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
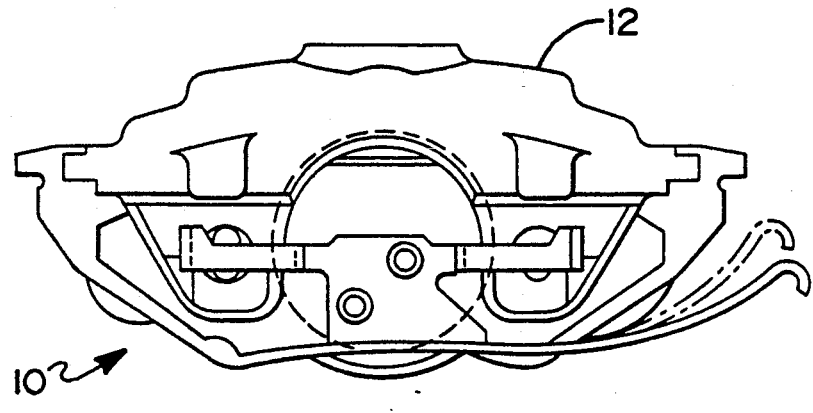
FIGS. 1 and 2 respectively illustrate side and cross-sectional views of a typical disc brake caliper assembly in the intended environment of the seal arrangement in accordance with the present invention.
Figure 2:
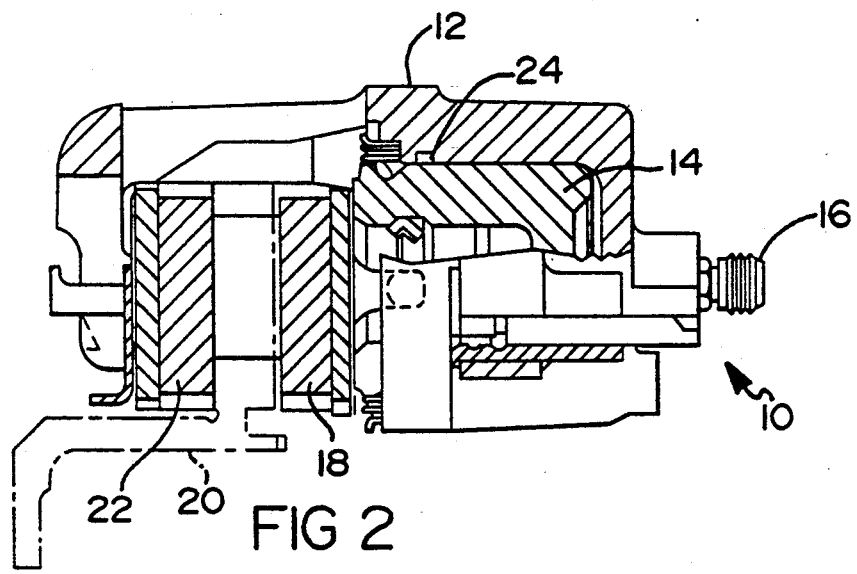

FIGS. 1 and 2 generally show at 10 a disc brake caliper which illustrates the intended environment of the present invention. Disc brake caliper 10 of FIG. 1 illustrates a caliper housing 12 which is actuated by a piston 14 as best illustrated in FIG. 2. Piston 14 is actuated by way of an hydraulic input as further illustrated in FIG. 2. Application of hydraulic pressure translates piston 14 towards a disc brake caliper brake pad 18 and the opposing surface of a rotor 20. This results in a backward translation of caliper housing 12 so that outer brake pad 22 is similarly frictionally engaged with rotor 20 to accomplish the braking function. A seal 24 generally is provided between an annularly extending groove of housing 12 and the outside diameter of piston 14. This seal provides an important function in that after translation of piston 14 into housing 12 during a braking operation, the piston is returned to its initial position by operation of the seal. That is, the seal returns piston 14 into its initial position for a subsequent braking operation and thereby provides the necessary running clearance between piston 14 and brake pad 18, and therefore the clearance between outer brake pad 22 and rotor 20. Thus, the retraction of piston 14 is accomplished without additional means other than the deflection characteristics of the seal itself, which also provides the required seal between the piston and the brake housing.

Figure 3:
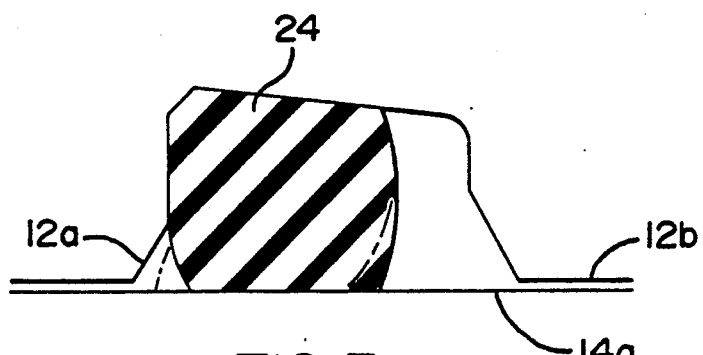
FIG. 3 illustrates a caliper seal in accordance with the prior art.

FIG. 3 illustrates a prior art seal device 24 which heretofore has been utilized to provide the required sealing and rollback functions. The inside diameter of the cylinder bore of caliper housing 12 is illustrated at 12b in FIG. 2 whereas the outside diameter of piston 14 is illustrated as 14a in FIG. 3. It can be seen that seal 24, once under pressure, is deflected approximately into the position deflected in dotted lines in FIG. 3. In order to accommodate this deflection, a significantly large chamfer 12a must be provided in housing 12. Tolerance of machining this chamfer contributes to a large variation in rollback within a population.

Figure 4:
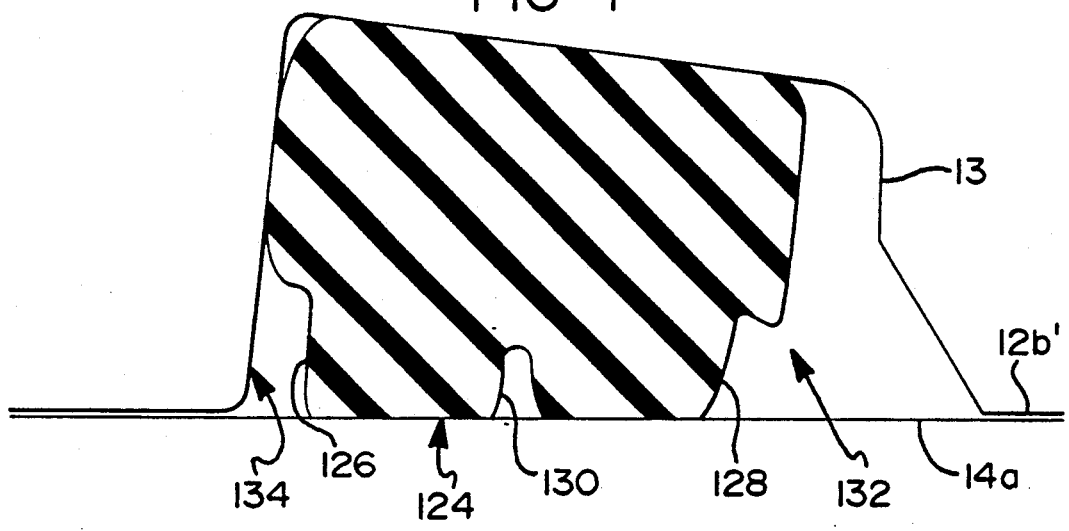
FIG. 4 illustrates a caliper seal in accordance with the principles of the present invention; and, FIG. 5 provides a more detailed views of the disc brake caliper seal in a preferred embodiment in accordance with the present invention.

Referring now to FIG. 4 there is shown a disc brake caliper seal in accordance with the teachings of the present invention. The seal of FIG. 4 is shown generally at 124 and includes a rubber piston seal of a generally square or rectangular configuration. It will be understood, however, that the cross-sectional configuration of seal 24 may take on any one of a number of different polygon configurations other than that illustrated herein. The outside diameter of piston 14 again is illustrated as 14a whereas the cross-sectional configuration of the housing groove is generally designated at 13. It can be seen that seal 124 is provided with annular recesses 126 and 128 provided at the ends of the parallel portion of seal 124 which are adjacent to the outside diameter 14a of piston 14. Seal 124 further includes an annular central groove provided in a central portion of that side of seal 24 which engages the outside diameter of piston 14.

Thus, seal 124 is provided with spaces on the ends of the parallel sides of the seal adjacent to the outside diameter of the piston. The central portion of the side of the seal which engages the outside diameter of the piston is provided with a circumferential groove 130. The annular recesses provide spaces of sufficient volume for the seal to deflect into, thereby eliminating the need for a machined chamfer in the housing groove. The housing groove 132 thus has a straight side 134 adjacent recess 126, and the sideway deflection of the seal 124 is controlled entirely by the volume of the space of the recess 126. By adjusting the size of the space of the recess 126, the nominal amount of rollback can be optimized to any desired level. The groove 130 in the central portion of the seal functions at high braking pressures, such as during a panic stop, to provide additional rollback and to reduce the loss of the required running clearance.

Figure 5A:
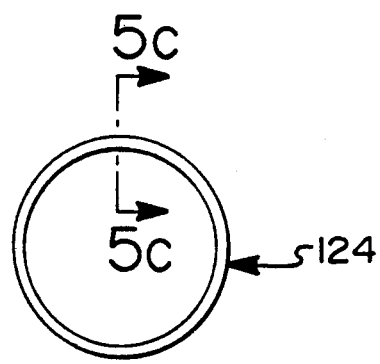
Figure 5B:
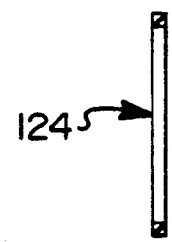
Figure 5C:
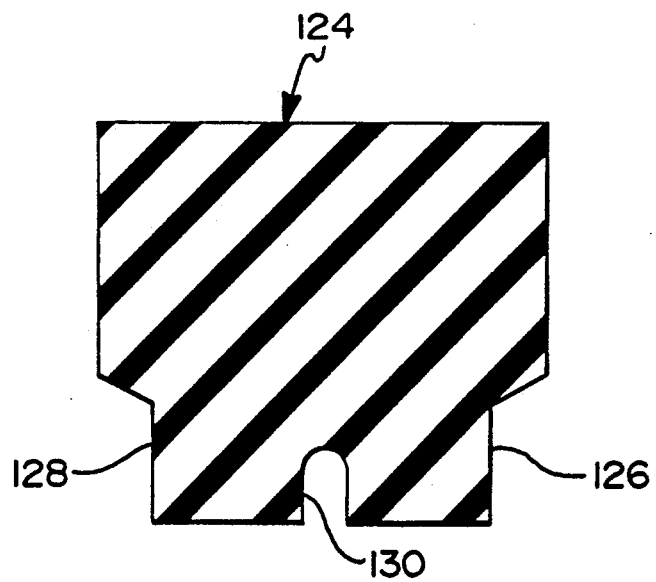

FIGS. 5a-5c provide more detailed views of seal 124 in accordance with the principles of the present invention. It can be seen from FIG. 5a that seal 124 is generally of an annular configuration including a specific cross-sectional configuration as illustrated more clearly in FIG. 5b. FIG. 5c further illustrates the free-state configuration of seal 124 including the recess and groove portions in accordance with the principles of the present invention. It can be seen that the recess and groove portions are provided along the radially outer portion of seal 124 and which function as previously described.

As discussed hereinabove with reference to Table 1, the seal arrangement in accordance with the present invention provides significantly improved running clearance and variability both at normal, and high braking pressure or panic stop braking situations. This, then eliminates complaints of spongy brake pedal on the one hand and brake roughness (excessively tight clearance) on the other hand.

As illustrated in Table 1, it has been found that at normal braking pressures (approximately 20 bars) the running clearance of the prior art disc brake systems may vary ±0.26 mm about the nominal 0.35 mm running clearance. In contrast, the running clearance provided by the seal in accordance with the present invention merely varied ±0.06 mm about the nominal 0.18 mm value. Similar results obtained in the high pressure (approximately 100 bars) mode.

What has been taught, then, is a disc brake caliper seal arrangement for disc brakes wherein an annular seal is provided facilitating, notably, optimized running clearance, minimized variation and elimination of the problems heretofore suffered in the prior art and which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A disc brake caliper seal arrangement for a disc brake having at least one brake pad for engaging a disc rotor, said arrangement comprising, in combination
   a disc brake caliper housing having a bore formed therein;
   a piston having an outside diameter slidably mounted in said bore in said housing for engaging said brake pad against said rotor upon actuation of said disc brake;
   actuation means for advancing said piston from an initial position into engagement with said rotor;
   a generally annular housing groove provided in said housing bore and facing the outside diameter of said piston said groove having a generally straight side wall extending substantially normally to said housing bore; and,
   a generally annular seal provided in said housing groove, said seal having an inside annular surface gripping said piston outside diameter and further having a generally rectangular cross-sectional configuration, said seal having at least one substantial annular recess adjacent said outside diameter of said piston and extending along a portion of one side of said seal adjacent said generally straight side wall of said groove which extends away from said outside diameter of said piston said recess defining a space adjacent said side wall of sufficient volume to accommodate entirely sideways deflection of said seal into engagement with said generally straight side wall caused by movement of said piston to a pre-determined degree sufficient to accommodate said piston movement and to insure return of said piston to said initial position.

2. The arrangement according to claim 1, wherein said seal includes a circumferential groove in the central portion of said inside surface of said seal which grips said outside diameter of said piston.

3. The arrangement according to claim 1, wherein said seal includes two recesses respectively provided on each side of said seal.

4. The arrangement according to claim 1 wherein said seal annular recess is formed by a shoulder formed at an intermediate level on said one side of said seal to form a step in said one side to establish a smaller seal width adjacent said piston outside diameter.

* * * * *